United States Patent [19]

Kane et al.

[11] Patent Number: 4,568,393

[45] Date of Patent: Feb. 4, 1986

[54] CARBURIZED HIGH CHROME LINER

[75] Inventors: Robert F. Kane; William D. Van Arnam, III, both of Houston, Tex.

[73] Assignee: TRW Inc., Cleveland, Ohio

[21] Appl. No.: 678,955

[22] Filed: Dec. 6, 1984

[51] Int. Cl.[4] .................. C23C 8/06; C23C 16/00; B05D 3/06

[52] U.S. Cl. .................. 148/6.35; 148/31.5; 427/37; 427/252

[58] Field of Search ............... 427/37, 252; 148/6.35, 148/31.5

[56] References Cited

U.S. PATENT DOCUMENTS

| | | | |
|---|---|---|---|
| 2,292,662 | 8/1942 | Sanders | 309/2 |
| 3,019,327 | 1/1962 | Engel | 219/76 |
| 3,271,554 | 9/1966 | Johnson | 219/76 |
| 3,712,182 | 1/1973 | Penwell | 92/169 |
| 3,827,920 | 8/1974 | Shimoda et al. | 148/15.5 |
| 3,918,137 | 11/1975 | Telang et al. | 29/156.4 WL |
| 3,980,506 | 9/1976 | Overkott | 148/16.5 |
| 4,256,518 | 3/1981 | Bolton et al. | 148/127 |

Primary Examiner—James R. Hoffman

[57] ABSTRACT

A hard corrosion resistant surface is provided on a ferrous substrate by first overlay welding onto the substrate surface a chromium containing ferrous material. The deposited overlay can then be machined. It is thereafter subjected to a carburization treatment at a temperature and for a time sufficient to cause the overlay to become converted to an austenitic material containing iron chromium carbides. After cooling, the carburized overlay material is heated for a time and at a temperature sufficient to cause the austenitic matrix material to precipitate secondary carbides and convert to a martensite matrix material upon cooling. It is also contemplated to initiate the aforesaid treatment with a suitably selected chromium containing ferrous material that thereby is not overlay welded.

19 Claims, No Drawings

CARBURIZED HIGH CHROME LINER

BACKGROUND OF THE INVENTION

It has been known to use overlay welding techniques in cylinders such as to improve the bore wear characteristics. Thus, in U.S. Pat. No. 2,292,662 it has been taught to weld spray a cylinder bore with a hard-wearing metal or alloy such as a chromium alloy. After such operation the bore can be machined to prepare a smooth surface. In a somewhat related teaching, U.S. Pat. No. 3,019,327 shows fusion welding of an overlay of clad metal onto a base metal. This technique is taught as useful in fabricating reactor shells, steam generators and other high temperature pressure vessels.

Other methods have also been employed to obtain water-resistant parts. Thus, in U.S. Pat. No. 3,980,506 there has been shown the use of a roller polishing operation together with a surface hardening operation which may be carburizing or nitriding. Furthermore, special applications can require special techniques. For example, U.S. Pat. No. 4,256,518 focuses on the outer periphery of a transition piece of a box tool joint member. This patent teaches first forming an annular groove in the outer periphery. Then a butter layer is welded into the groove and heat treated. Lastly, a hard facing layer is added to the butter layer.

Considering again the problem of wear resistance for interior surfaces, U.S. Pat. No. 3,918,137 focuses on preparing a wear-resistant surface for an internal combustion engine. To accomplish this, there is first thermally sprayed a coating of particles which are of generally equal hardness such as particles of a martensitic stainless steel mixed with a particulate hard nickel based alloy. The sprayed coating is immediately quenched in oil. Thereafter it is machined to a finished contour. In further regard to internal combustion engines, wear resistance for rocker arms has also attracted attention. In U.S. Pat. No. 3,827,920 an atomized molten metal, more particularly a self-fluxing alloy is sprayed onto the substrate metal surface. The applied metal is thereafter fused. Lastly, it is subjected to a nitriding or carbonitriding treatment.

Pump liners also require high hardness to provide suitable service. In current practice, the solution for providing this hard liner surface has most typically been the use of a high chrome iron sleeve. The high chrome iron sleeve can be centrifugally cast. After annealing to reduce the hardness to a machineable range, the casting may be bored and turned. The sleeve is then hardened by heating and air cooling. Afterwards it is ground to the inside diameter of the shell and assembled into the shell by shrink fitting. But maintenance of the fitting in place can be a problem.

Accordingly, it is the principal object of the present invention to provide a means of overcoming typical problems associated with the various prior art techniques for hardening the wear surface of a given article, such as a pump liner.

In addition, other objects of the present invention will become apparent to those skilled in the art from a reading of the following specification and claims.

BRIEF SUMMARY OF THE INVENTION

It is more desirable on a hard wearing surface, e.g., a pump liner, to prepare the surface in place rather than provide a fitted sleeve. Such in place surface preparation can overcome the slippage problems of inserts. It would also be most desirable to obtain a surface of excellent hardness characteristic that combines with excellent corrosion resistance.

To these ends a method has now been found for producing a hard corrosion resistant coating on a surface of a ferrous substrate. Initially, there is deposited on the ferrous substrate a layer of chromium containing ferrous material by overlay welding, the overlay ferrous material containing from about 15 to about 35 weight percent chromium, with the remainder being iron plus residuals. The surface of the deposited chromium containing ferrous overlay material may then be machined to essentially the final surface condition desired. The overlay surface is then subjected to a carburization treatment at a temperature ranging from about 1900° F. to about 2050° F. for a period of time sufficient to cause the chromium containing ferrous material to become converted to an austenitic material containing iron chromium carbides. Thereafter, the carburized overlay material is cooled to a temperature of less than about 1800° F. Following this, the cooled overlay material is heated for a period of time and at a temperature sufficient to cause the austenitic matrix material to precipitate secondary carbides and convert to a martensite matrix material upon cooling.

In one aspect of the invention it is also contemplated to provide articles with hard and corrosion resistant surfaces where the articles at the outset are of a compositon of the heretofore described chromium containing ferrous material, and then subject same to the critical carburization treatment followed by the above defined cooling and heating steps.

DETAILED DESCRIPTION OF PREFERRED EMBODIMENTS

A suitable ferrous substrate to be considered at the start of the method of the present invention is one that is typically inexpensive, easy to machine and weldable. If it is to be welded, it should have an about 0.50 weight percent maximum carbon content. Such substrates will often be available in wrought or cast condition. Ferrous substrates will typically be carbon or low alloy steels such as AISI 1050, AISI 4130, or AISI 8620. In the case of pump liners, for which the invention is especially useful, the ferrous substrate of the liner shell will be of a composition generally producing a yield strength of 50,000 psi. On analysis, such representative material can be found to contain 0.25 to 0.30 weight percent carbon, 0.80–1.00 weight percent manganese, 0.04 weight percent maximum phosphorous, 0.045 weight percent maximum sulphur, 0.50–0.80 weight percent silicon, 0.50 weight percent maximum nickel, 0.35 maximum weight percent chromium and 0.07–0.11 weight percent vanadium with a balance of iron.

In the one aspect of the invention where it is not comtemplated to overlay weld, but rather to select a suitable chromium containing ferrous substrate, such suitable substrate material should have sufficient alloy content to develop necessary design strength after heat treatment. It should also have above about 15 weight percent chromium to, on the one hand, form the desired iron chrome carbides for abrasion resistance and, on the other hand, provide sufficient chromium in the matrix for corrosion resistance. This suitably selected substrate may contain as much as 35 weight percent of chromium. A useful commercially available material would be ACI TYPE HC, AISI 436, AISI 446 or XM-27.

Where there is simply a ferrous substrate for overlay welding, it is next provided with a deposit of chromium containing ferrous material by overlay welding. Specific useful techniques for the overlay welding can include the plasma transfer arc process, the gas metal arc process, and the gas tungsten arc process. This overlay welding deposits a layer of soft stainless steel material on the ferrous substrate. Generally the welded overlay will have a hardness ranging from about HRC 12 to about HRC 20. However, the overlay will be resistant to cracking. This is desirable since the overlay will most always be machined and by use of the chromium containing ferrous material as the overlay layer it will not only be readily machined, but it will also lend itself to being carburized. In the use of particular interest, referring to the bore of a mud pump liner, a deposited layer having a thickness within the range from about 1/16 inch to about ⅛ inch is acceptable. A greater deposit, e.g., up to about 3/16 inch, is generally uneconomical as it can add to welding and machining costs. An overlay layer of less than about 1/32 of an inch is generally undesirable as not providing enough depth of deposit to insure adequate depth of carburization.

It is necessary that the chromium containing ferrous material have from about 15 to about 35 weight percent chromium. This will insure the desirable corrosion resistance of the layer while in use as well as providing for other layer characteristics, e.g., ease of machining. More typically the layer as deposited will contain from about 20 to about the 30 weight percent chromium. It is to be understood that in a process such as plasma transferred arc welding, there may be some difference in chromium content from the material as used, to the material as deposited. For example, a deposit containing on the order of 26 to 28 weight percent chromium may result from the plasma transferred arc welding of material containing up to 35 weight percent chromium. The deposited material might also contain up to 4 weight percent silicon and up to 3 weight percent molybdenum. Other residuals in the material can include up to about 0.05 weight percent of carbon, typically on the order of about 4 weight percent or less of nickel and/or copper, less than about 0.5 or less weight percent of manganese, and lesser amounts of phosphorous, sulphur, and vanadium. With this combination of elements in these amounts, the hardness of this overlay weld can be expected to be on the order of HRC 12.

When the weld deposit is subjected to subsequent machining this will be done principally to remove irregularities of the weld bead. Furthermore it is preferably carried out to yield essentially the final surface conditions desired since a characteristic of the overlay material is ease of machining. It is suitable to carry out the machining by conventional boring and turning techniques.

The chromium containing ferrous material, as a suitably selected substrate or as an overlay weld deposit, is then subjected to a carburization treatment. Such treatment can employ one of several techniques, including conventional gas carburizing and pack carburizing. For efficient operation, partial pressure, or "vacuum" carburizing and plasma techniques may be preferred. The carburization treatment should be carried out at a temperature ranging from about 1900° F. to about 2050° F. Use of a temperature less than about 1900° F. is uneconomical for expediting the carburization treatment. A temperature above about 2050° F. increases the likelihood of eutectic melting which can occur in the iron-carbon system. It is most advantageous for avoiding eutectic melting as well as for enhancing carburization time, to carry on this treatment at a temperature within the range from about 1900° F. to about 2000° F.

Such carburization should be carried on for a time sufficient to provide the desired carburization depth for the particular application of the ferrous material, by insuring the desired depth of microstructure change in the material to a soft austenitic matrix. At 2000° F., a carburization depth of about 0.010 inch is achieved in about 3 hours. However, by stretching out the treatment time to about 16 hours, carburization can be expected to reach a depth of on the order of 0.040 inch. In the particular application of an overlay of ferrous material for mud pump liners, which require an 0.020 inch, in-service wear life before failure, carburization to a 0.030 inch depth is contemplated. Such can typically be achieved in vacuum carburization or a pack carburizing treatment at a temperature ranging from about 1900° F. to about 2000° F. and employing treatment times within the range from about 12 hours for the more elevated temperatures of the range to about 24 hours at the lower range temperatures. This treatment can provide the about 2.3 weight percent minimum carbon content, in the carburization zone, which is sought for such mud pump liner service. As a result of the carburization the microstructure of the chromium containing ferrous material changes from a ferritic matrix to one that contains numerous, e.g., 30 to 50 percent, of hard iron chromium carbides in a soft austenitic matrix. The hardness of the carburized mud pump liner material at this time is typically on the order of about HRC 45. It is to be understood that to enhance the carburizing effect a treatment such as burnishing can be employed with the chromium containing ferrous material.

Following carburization the material is cooled to a temperature of less than about 1800° F. It will be most usual that the material is permitted to cool to essentially room temperature. After cooling, the material is heated for a period of time and at a temperature sufficient to cause the austenitic matrix material to precipitate secondary carbides. Such heating should be sufficient to heat the material to a temperature of at least about 1800° F. When considering the specific mud pump liner articles of choice, heating at the 1800° F. temperature for a time on the order of one hour will be sufficient to provide for desirable secondary carbide precipitation. After this heating, the material is cooled, thereby transforming the austenitic matrix to martensite upon cooling. The hardness of the carburized material for a typical mud pump liner after this treatment can be expected to be above about HRC 61.

In one example the process according to the invention is carried out with mud pump liners. The liners used typically have a bore size of about 6 inches, an outside diameter of about 8 inches and a length of about 12 inches. The liner shell as currently produced has a yield strength of 50,000 psi. An analysis of a typical mud pump liner material shows: carbon 0.25 to 0.30 weight percent maximum, manganese 0.80–1.00 weight percent, phosphorous 0.04 weight percent maximum, sulphur 0.045 weight percent maximum, silicon 0.50–0.80 weight percent, nickel 0.50 weight percent maximum, chromium 0.35 weight percent maximum, vanadium 0.07–0.11 weight percent and a balance of iron. The interior bore of the mud pump liner is welded using plasma transferred arc welding. The particulate overlay material used in the welding has the following analysis, as received: carbon 0.02 weight percent, manganese 0.13 weight percent, silicon 3.20 weight percent, nickel 0.50 weight percent, chromium 35.0 weight percent, molybdenum 0.10 weight percent and a balance of iron. The thickness of the weld deposit varies from approximately 3/32 inch to ⅛ inch. The weld deposit analysis, as deposited, is: carbon 0.05 weight percent, manganese 0.32 weight percent, phosphorous 0.02 weight percent, sulphur 0.02 weight percent, silicon 2.70 weight percent, nickel 0.40 weight percent, chromium 26.0–28.0 weight percent, molybdenum 0.10 weight percent with a balance of iron. The hardness of this overlay weld is approximatey HRC 12.

This overlay weld in the bore of the pump liner is machined using conventional boring and honing techniques to provide a smooth, uniform weld surface. The thus produced liner is thereafter carburized by partial pressure carburizing. The furnace is evacuated to 400 torr and methane is used as the carburizing gas. Test samples carburized at 1910° F. for 8 hours under such conditions show a carburization depth of about 0.020 inch. More preferably, carburizing under such conditions at 2000° F. for 16 hours produces a carburization depth of 0.040 inch and a hardness of the carburized overlay weld of HRC 45.

The resulting carburized mud pump liner is thereafter cooled to room temperature. Following this, it is heated to 1800° F. for one hour then permitted to cool to transform the austenite matrix to martensite. The hardness of the carburized case after this treatment is now HRC 61 minimum.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

Having thus described the invention, it is now claimed:

1. A method of producing a hard corrosion resistant coating on a surface of a ferrous substrate which method comprises:
   providing a ferrous substrate;
   depositing a layer of chromium containing ferrous material on a surface of said substrate by overlay welding, said overlay ferrous material containing from about 15 to about 35 weight percent chromium, with the remainder being iron plus residuals;
   subjecting the surface of the deposited chromium containing ferrous overlay material to a carburization treatment at a temperature ranging from about 1900° F. to about 2050° F. for a period of time sufficient to cause said chromium containing ferrous material to become converted to an austenitic material containing iron chromium carbides;
   cooling the carburized overlay material to a temperature of less than about 1800° F.; and,
   heating said cooled overlay material for a period of time and at a temperature sufficient to cause said austenitic matrix material to precipitate secondary carbides and convert to a martensite matrix material upon cooling.

2. The method of claim 1 further characterized by machining the surface of the deposited chromium containing ferrous overlay material to essentially the final surface condition desired prior to subjecting said machined surface to a carburization treatment.

3. The method of claim 1 wherein said ferrous substrate is a carbon or low alloy steel substrate in wrought or cast condition having an 0.50 weight percent maximum carbon content.

4. The method of claim 1 wherein said overlay welding deposits a ferrous material containing up to about 4 weight percent silicon and up to about 3 weight percent molybdenum, with the balance being chromium and iron plus residuals.

5. The method of claim 4 wherein said residuals are selected from the group consisting of carbon, manganese, nickel, phosphorous, sulphur and vanadium.

6. The method of claim 1 wherein said overlay welding deposits a ferrous material containing from about 15 to about 35 weight percent chromium.

7. The method of claim 1 wherein said overlay welding deposits a ferrous material to a depth not greater than about ⅛ inch by plasma transferred arc, gas metal arc or gas tungsten arc welding of said ferrous substrate.

8. The method of claim 1 wherein said ferrous overlay material surface is carburized by partial pressure carburizing, or conventional gas carburizing, or plasma carburizing or pack carburizing.

9. The method of claim 1 wherein said ferrous overlay material surface is carburized at a temperature ranging from about 1900° F. to about 2000° F. for a period of time from about 3 hours to about 24 hours thereby providing a carburized depth in said overlay ranging from about 0.010 inch to about 0.040 inch from the surface of said overlay.

10. The method of claim 1 wherein the carburized overlay material contains at least about 2.3 weight percent carbon.

11. The method of claim 1 wherein the carburized overlay material is thereby hardened to about HRC 45.

12. The method of claim 1 further characterized by burnishing said ferrous overlay material prior to subjecting said material to said carburization treatment.

13. The method of claim 1 wherein said cooled substrate is heated to a temperature of about 1800° F. for a time of about one hour and after cooling provides martensite matrix material with a resulting hardness of about HRC 61 minimum.

14. The method of claim 1 wherein after carburization the microstructure of said overlay ferrous material contains above about 30 percent hard iron chromium carbides in an austenitic matrix.

15. The method of claim 1 wherein said ferrous substrate is an interior pump liner surface.

16. The hard, corrosion resistant article prepared by the method of claim 1.

17. A method adapted for producing a liner article having a hard and corrosion resistant interior surface which method comprises:
   establishing said article from chromium containing ferrous material containing from about 15 to about 35 weight percent chromium, with the remainder being iron plus residuals;
   subjecting said chromium containing article to a carburization treatment at a temperature ranging from about 1900° F. to about 2050° F. for a period of time sufficient to cause said chromium containing ferrous material to become converted to an austenitic material containing iron chromium carbides;
   cooling the carburized overlay material to a temperature of less than about 1800° F.; and, heating said cooled overlay material for a period of time and at a temperature sufficient to cause said austenitic matrix material to precipitate secondary carbides and convert to a martensite matrix material upon cooling.

18. The method of claim 17 wherein said article is a pump liner established from a chromium containing ferrous material.

19. The method of claim 17 wherein said article is established from material containing silicon and molybdenum along with said chromium.

* * * * *